United States Patent [19]
Brantley

[11] Patent Number: 5,816,462
[45] Date of Patent: Oct. 6, 1998

[54] CARGO CARRIER FOR ALL-TERRAIN VEHICLES

[76] Inventor: Thomas Wayne Brantley, 422 York Rd., NE., Cleveland, Tenn. 37323

[21] Appl. No.: 837,253

[22] Filed: Apr. 10, 1997

[51] Int. Cl.$^6$ .................................................. B60R 9/045
[52] U.S. Cl. .......................... 224/570; 224/552; 224/558; 224/401; 248/316.4
[58] Field of Search ..................................... 224/401, 412, 224/441–448, 458, 459, 461, 495, 501, 523, 545, 546, 548, 551–555, 558, 570; 248/230.3, 316.4

[56] References Cited

U.S. PATENT DOCUMENTS

| | | | |
|---|---|---|---|
| 1,688,148 | 10/1928 | Martin | 224/551 |
| 1,719,821 | 7/1929 | Alexander | 224/570 |
| 3,240,455 | 3/1966 | Sezy et al. | 224/558 |
| 3,877,622 | 4/1975 | McLain | 224/924 |
| 4,057,182 | 11/1977 | Kolkhorst et al. | 224/552 |
| 4,072,257 | 2/1978 | Lall | 224/521 |
| 4,607,773 | 8/1986 | Mason | 224/546 |
| 4,944,434 | 7/1990 | Hamilton | 224/551 |
| 5,096,102 | 3/1992 | Tolson | 224/501 |
| 5,217,149 | 6/1993 | Simonett | 224/458 |
| 5,284,282 | 2/1994 | Mottino | 224/553 |
| 5,443,189 | 8/1995 | Hirschfeld | 224/501 |

FOREIGN PATENT DOCUMENTS

447912 A  1/1913  France ................................. 224/552

Primary Examiner—Allan N. Shoap
Assistant Examiner—Gregory M. Vidovich

[57] ABSTRACT

An adjustable cargo carrier consisting of a plurality of devices which attach to manufacturer-installed frame racks of all-terrain vehicles. Constructed of tubular metal, the cargo carrier has a main tube body which attaches to the all-terrain vehicle by bolting a flat metal adapter plate to a mounting plate which is welded to the main tube body. An upper holding arm, which slides into the upper end of the main tube body, pivots laterally and can extend vertically. The main tube body inserts into a lower arm mount tube which is welded to the lower holding arm. The lower holding arm pivots laterally. The upper holding arm and lower holding arm, which are tightened through the use of locking knob bolts, are both encased in padded protective sleeves.

5 Claims, 2 Drawing Sheets

CARGO CARRIER FOR ALL-TERRAIN VEHICLES

BACKGROUND

1. Field of Invention

This invention relates to cargo carriers, specifically to cargo carriers to be used with all-terrain vehicles.

2. Description of Prior Art

Most all-terrain vehicles (ATV's) are manufactured with a cargo rack on the front or rear of the ATV. These ATV racks are tubular frames and require the use of rope, leather straps, or elastic straps to attach the cargo on the rack. However, attachment by these devices results in an unstable attachment which can cause damage to the ATV, the rack or the equipment. Additionally, directly affixing cargo to the ATV rack is an inefficient use of the rack because it precludes carrying additional cargo.

To alleviate these problems, inventors have created independent carrier devices which attach to various aspects of the ATV. These designs allow expanded cargo capacity because they attach to the cargo-installed rack, which allows the rack to be used to transport additional cargo. U.S. Pat. No. 4,915,273 to Allen (1990) discloses a carrier comprised of two brackets which mount to the handlebars of an ATV or motorcycle to allow a bow or gun to be carried. However, this carrier is limited to carrying these weapons only and it does not attach to the rack of many ATV's. Furthermore, positioning the carrier on the handlebars restricts control of the vehicle and presents potential safety risks.

Other solutions have been proposed but do not appear to be patented. One such solution consists of an inverted T-shaped carrier which belts to the rear racks of the ATV. However, this design adjusts only in the vertical plane and provides only a single-point contact at the top center of the cargo. This design is unstable and allows the cargo to shift and vibrate, which can result in the cargo falling off. This approach requires the use of an elastic cord to stabilize the cargo, which poses a danger to vehicle operation if the cord comes loose. An example of this design is marketed as the Treestand Buddy by Tally, for which no patent has been discovered. As indicated by its name, the Treestand Buddy is designed to carry treestands only.

An additional approach to carrying cargo has been the use of a metal frame which attaches to ATV racks. By design, this approach requires rubber or elastic cords to affix cargo to the metal frame. In addition to the danger posed by the cords, this design does not adequately secure the cargo and is limited in its weight capacity. I am aware of no patents which have been issued for these metal frame designs.

OBJECTS AND ADVANTAGES

Several objects and advantages of the present invention are:

(a) to provide a carrier which adjusts to hold cargo securely so as to preclude vibration or shifting, thus avoiding damage to the vehicle, the manufacturer-installed racks, or the cargo;

(b) to provide a carrier which has upper and lower holding arms which provide at least two points of contact on upper and lower areas of cargo being carried;

(c) to provide a carrier which provides stability without the use of potentially dangerous cords or straps;

(d) to provide a carrier which has substantial weight capacity and is able to keep the cargo properly centered, thereby providing increased safety in operation;

(e) to provide a carrier which, through the use of flexible sleeve covers on the upper and lower holding arms, protects both the carrier and the cargo from damage;

(f) to provide a carrier which, through increased adjustability vertically and horizontally, provides an enhanced ability to carry a variety of cargo sizes and shapes;

(g) to provide a carrier which adjusts out of the way when not in use, thus allowing the carrier to remain attached to the ATV when not being used;

(h) to provide a carrier which attaches to virtually all of the manufacturer-installed ATV racks through the employment of specific adapter plates; and (i) to provide a practical, attractive and multi-functional ATV rack-mounted carrier.

Further objects and advantages are to provide a carrier which will match ATV manufacturer-installed racks in coating finish and durability. Still further objects and advantages will become apparent from consideration of the following description and drawings.

DRAWINGS/FIGURES

Reference Numerals in Drawings

Figure 1:
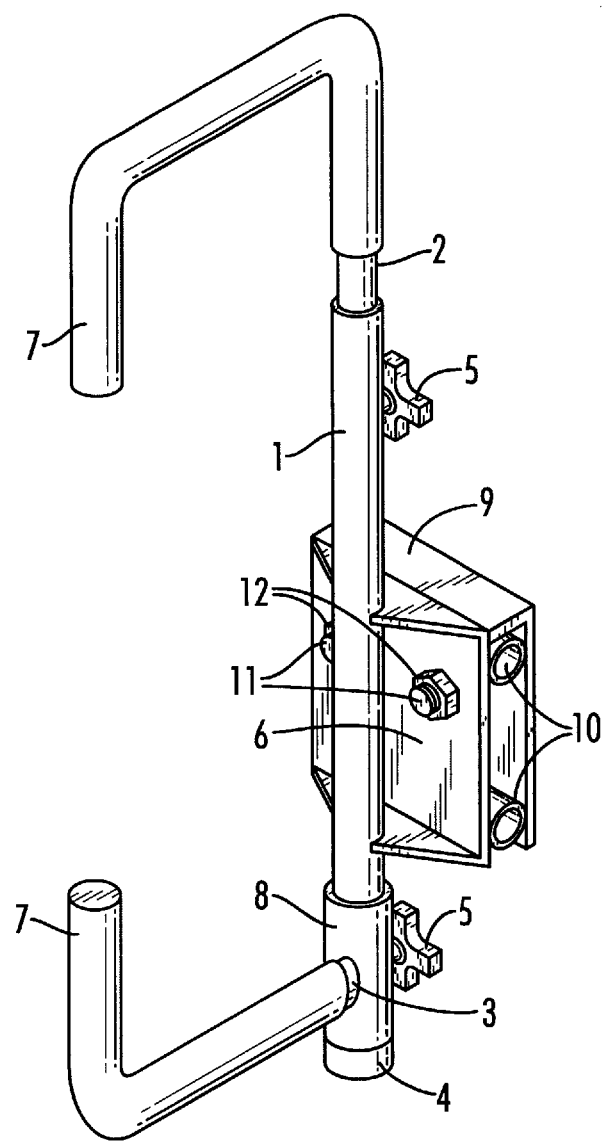
FIG. 1 shows an isometric perspective view of the present invention.

1. Main tube body
2. Upper holding arm
3. Lower holding arm
4. Retainer ring
5. Locking knob bolt (2)
6. Mounting plate
7. Flexible sleeve protector (2)
8. Lower arm mount tube
9. Adapter plate
10. Rack protectors (2)
11. Mounting bolts (2)
12. Lock nuts (2)

DESCRIPTION-FIGURES 1 AND 2

Figure 2:
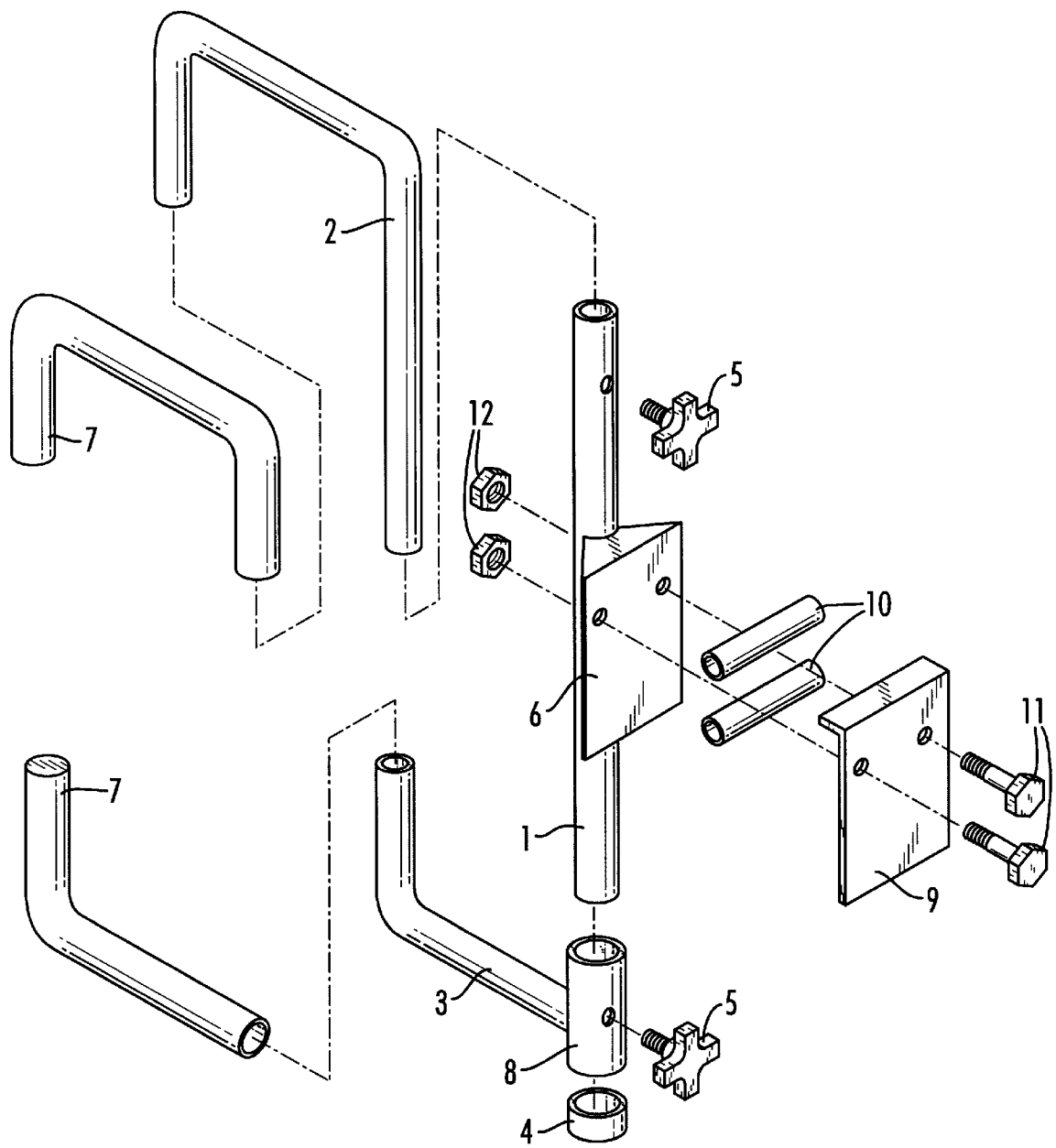
FIG. 2 is an exploded isometric view of the present invention.

A typical embodiment of the present invention is illustrated in FIG. 1, which provides an isometric perspective view. FIG. 2 represents an exploded isometric view which further illustrates the relationship of the invention's parts.

Into a hole in the upper end of a main tube body 1 is inserted an upper holding arm 2. A lower holding arm 3 is permanently affixed to a lower arm mount tube 8 which slides over the lower end of main tube body 1. A retainer ring 4 is permanently affixed to the lower end of main tube body 1 which prevents lower arm mount tube 8 from sliding off main tube body 1. As illustrated, the main tube body 1, the upper holding arm 2 and the lower holding arm 3 are cylindrical members and thus the upper and lower holding arms may pivot or rotate about the axis of elongation of the main tube body 1. Upper holding arm 2 and lower holding arm 3 secure to main tube body 1 by locking knob bolts 5 which are threaded to screw into threaded holes in main tube body 1 and lower arm mount tube 8, respectively. Upper holding arm 2 and lower holding arm 3 are each encased by a flexible sleeve protector 7. Permanently affixed to main tube body 1 is a mounting plate 6. An adapter plate 9 attaches to mounting plate 6 through the use of mounting bolts 11 and lock nuts 12. Mounting plate 6 and adapter plate 9 each have holes which are aligned and through which mounting bolts 11 pass. Flexible rack protectors 10 are inserted between mounting plate 6 and adapter plate 9. The tubular members and the mounting plates are constructed from metal which may be covered with powder resin which is baked onto the outer surfaces.

Operation Of Invention

Employment of my invention in its embodiment as a cargo carrier requires that at least two devices be employed conjunctively. Main tube body 1 is the invention's central component. In its present embodiment, it is constructed of tubular steel. A hole in the upper end of main tube body 1 has an inner diameter which is sufficient to allow upper holding arm 2 to be inserted into the hole. Upper holding arm 2 pivots laterally with main tube body 1 as its axis. It can also extend vertically up to approximately four (4) inches. Upper holding arm 2 is encased in flexible protective sleeve 7 which is constructed of poly-vinyl padded material. After cargo is placed on the carrier, upper holding arm 2 adjusts axially and radially relative to the main tube body 1 to provide a secure fit and locks into position by tightening locking knob bolt 5 which is threaded to screw into a threaded hole in main tube body 1.

Lower holding arm 3 is welded to lower arm mount tube 8 which has an inner diameter of such dimension to allow the lower end of main tube body 1 to be inserted into lower arm mount tube 8. Retainer ring 4, which is of the same diameter of lower arm mount tube 8, is welded into main tube body 1 to fix the position of lower arm mount tube 8. Lower holding arm 3 pivots laterally in the horizontal plane with main tube body 1 as its axis. Lower holding arm 3 is encased in flexible protective sleeve 7 which is constructed of poly-vinyl padded material. Cargo rests on lower arm mount tube 8 which adjusts laterally to securely hold cargo and locks into position by tightening locking knob bolt 5 which is threaded to screw into a threaded hole in lower arm mount tube 8. Accordingly, it is seen that both the upper holding arm 2 and the lower holding arm 3 may be adjusted axially and radially relative to the main tube body 1.

Mounting plate 6 is welded to main tube body 1 at a position approximately mid-way between the upper and lower end of main tube body 1. Mounting plate 6 is constructed of steel plate which has triangular-shaped upper and lower surfaces which are perpendicularly bent on the upper and lower edges. These triangular surfaces have circular cutout areas which have a radius equal to the radius of main tube body 1 to which mounting plate 6 is welded.

Adapter plate 9, which has a flange which bends at approximately a 90% angle from the main plate surface, attaches to mounting plate 6 by the use of mounting bolts 11 and lock nuts 12. Adapter plate 9 and mounting plate 6 have holes which are aligned and of sufficient diameter to allow mounting bolts 11 to be inserted through the holes. Virtually every ATV rack which is presently manufactured has two tubular rails to which adapter plate 9 and mounting plate 6 attach. Rack protectors 10 are inserted between mounting plate 6 and adapter plate 9 above and below mounting bolts 11 to protect the tubular rack rails of the ATV from being marred.

Summary, Ramifications, and Scope

Accordingly, the reader will see that the features of this carrier which allow adjustment horizontally and vertically provides substantial flexibility in the range of cargo which can be carried. In addition, the protective sleeves prevent damage to the cargo. The design requires that two or more devices are employed in conjunction. Thus, with at least two upper and two lower points of contact, the cargo is transported safely and securely without the use of potentially dangerous elastic cords. Furthermore, the cargo carrier has the additional advantages in that

- the independent attachment of two or more of the devices at varying points on the ATV's rack allows further adaptability to varying sizes and shapes of cargo;
- the appearance of the carrier is consistent with the manufacturer-installed racks of the ATV;
- the use of powder-coating on the carrier provides a durable, attractive appearance;
- the adjustability of the device allows it to remain attached to the ATV rack when not being used because it can be folded out of the way;
- the adapter plates attach easily and securely to the ATV rack and the use of padded protective sleeves prevents damage to the rack; and
- the attachment of the cargo carrier to the outer rail of the ATV rack expands the cargo-carrying capacity by freeing up the manufacturer-installed ATV rack to be used for additional cargo.

Although the description above contains many specificities, these should not be construed as limiting the scope of the invention but as merely providing illustrations of some of the presently preferred embodiments of this invention.

Thus, the scope of the invention should be determined by the appended claims and their legal equivalents, rather than by the examples given.

I claim:

1. A device mountable on a vehicle for transporting objects, comprising:

a. a main tube body member constructed of rigid tubular material of a predetermined length b. an upper holding arm member constructed of rigid tubular material of a predetermined length, said upper holding arm member having one or more predetermined bends and having such outer diameter dimension that it can be inserted in a hole in the end of said main tube body member;

c. a lower holding arm member constructed of rigid tubular material of a predetermined length, said lower holding arm member having one or more predetermined bends and said lower holding arm member being attached in a perpendicular manner to a lower arm mount tube member of a predetermined length, said lower arm mount tube member being of sufficient inner diameter to allow the outer diameter of said main tube body member to be inserted;

d. a retainer ring member constructed of rigid material of a predetermined size, said retainer ring member being attached to the lower end of the main body member; and e. means for affixing the device to said vehicle comprising a plurality of rectangular shaped rigid plates, one of said plates being permanently affixed to said main tube body member, and said plates having respective holes align to permit receipt of connecting bolts.

2. The device of claim 1 wherein said upper arm member and said lower arm member are enclosed by sleeves constructed of flexible material.

3. The device of claim 1 wherein said upper holding arm member can lock into place through employment of a locking knob bolt, said locking knob bolt having a threaded bolt as a component part, which bolt screws into a threaded hole in the upper one-third of said main tube body member and tightens by the compression of the bolt end impacting against the outer surface of said upper holding arm member.

4. The device of claim 1 wherein said lower holding arm member can lock into place through employment of a locking knob bolt, said locking knob bolt having a threaded bolt as a component part, which threaded bolt screws through a threaded hole in said lower arm mount tube member and tightens by the compression of the bolt end impacting against the outer surface of said main tube body member.

5. A device mountable on a vehicle for transporting objects, comprising:

a. a cylindrical rigid tubular main tube body member of a predetermined length;

b. an upper cylindrical rigid tubular holding arm member of a predetermined length, said upper holding arm member having at least one predetermined bend and having an outer diameter dimension permitting insertion in an end of said main tube body member;

c. a lower cylindrical rigid tubular holding arm member of a predetermined length, having at least one predetermined bend;

d. a lower arm mount cylindrical tubular member of a predetermined length, said lower arm mount tube member having an inner diameter permitting insertion of a lower end of said main tube body member therethrough;

e. means for connecting said lower holding arm member to said lower arm cylindrical tubular member mount with the axis of a portion of said lower holding arm extending radially relative to said lower arm mount cylindrical tubular member;

f. a retainer ring member constructed of rigid material secured to the lower end of the main body member to trap said lower arm mount member on said main body member; and g. means for affixing the device to said vehicle.

* * * * *